US005585677A

United States Patent [19]
Cheon et al.

[11] Patent Number: 5,585,677
[45] Date of Patent: Dec. 17, 1996

[54] BACKUP POWER-SUPPLY SYSTEM FOR EMERGENCY

[75] Inventors: Kyungyong Cheon; Kyungseol Min; Kyungsang Lee, all of Suwon, Rep. of Korea

[73] Assignee: Samsung Electronics Co., Ltd., Suwon, Rep. of Korea

[21] Appl. No.: 366,759

[22] Filed: Dec. 30, 1994

[30] Foreign Application Priority Data

Dec. 30, 1993 [KR] Rep. of Korea ................. 1993-31255
Nov. 9, 1994 [KR] Rep. of Korea ................. 1994-29301

[51] Int. Cl.[6] ...................................................... H02J 7/10
[52] U.S. Cl. ...................... 307/64; 307/43; 307/66; 320/2; 363/37; 363/108; 363/126; 327/538
[58] Field of Search ................................ 307/64, 43, 66; 320/2; 303/37, 108, 126; 327/538

[56] References Cited

U.S. PATENT DOCUMENTS

| | | | |
|---|---|---|---|
| 4,194,240 | 3/1980 | Davis | 363/126 |
| 5,079,527 | 1/1992 | Goldfarb | 333/127 |
| 5,289,046 | 2/1994 | Gregororich | 307/66 |
| 5,347,164 | 9/1994 | Yeh | 307/66 |
| 5,384,792 | 1/1995 | Hirachi | 371/66 |
| 5,465,011 | 11/1995 | Miller et al. | 307/64 |

*Primary Examiner*—Jonathan Wysocki
*Assistant Examiner*—Albert W. Paladini
*Attorney, Agent, or Firm*—Cushman Darby & Cushman, L.L.P.

[57] ABSTRACT

The present invention discloses a backup power-supply system for emergency that may apply power to a data processing system and recover the information in it when the power supply is cut off or a power-supply connector is abruptly removed due to a careless user, so as to prevent the damage to the information the user is working on.

When the power is applied to the system, a battery is charged with the direct current power applied from a linear conversion rectifier by a battery charger, and when the power is not applied to the system while a power switch is being turned on, a DC/DC converter is operated by a power controller to apply the DC power charged in the battery to the main power-supply system after the direct current has been converted into DC/DC power in such a manner that the main power-supply means applies to the system the power for recovering the information a user was working on in the system.

24 Claims, 6 Drawing Sheets

BACKUP POWER-SUPPLY SYSTEM FOR EMERGENCY

BACKGROUND OF THE INVENTION

1. Field of the Invention

The present invention relates to a backup power-supply system. More particularly, it relates to a backup power-supply system for an emergency that applies power to a data processing system so as to recover the information in it when a power supply is cut off or a power-supply connector is abruptly removed due to a careless user, so as to prevent damage to the information the user is working on.

2. Description of the Related Art

In a large-sized data processing system, an uninterrupted power supply is employed to apply power continuously to the system for a predetermined period of time after the power supply has been abruptly cut off to prevent damage to the information the user is working on.

Korean Patent Publication No. 93-432 (published on Jan. 21, 1993) entitled "An Uninterrupted Power Supply (UPS) System and a Method for Supplying Power" discloses a technique for such an uninterrupted power supply.

However, at present, it is not easy to apply the above UPS to a small-sized data processing systems such as personal computers due to its cost and size.

SUMMARY OF THE INVENTION

The present invention is made in an effort to solve the above problem, and provides a backup power-supply system for an emergency that applies power required for recovering information before stoppage of the power supply by charging batteries of small capacity installed in the data processing system.

In order to achieve the above object, the backup system of the present invention includes a power switch and a linear conversion rectifying circuit which receives the alternating current power on an input path independent of the power switch. A battery is charged by a charging circuit, a power condition sensing circuit senses if the alternating power is normally applied from the linear conversion rectifying circuit, and a power switch condition sensing circuit produces a low-level signal if the alternating current power is input through the power switch, and produces a high-level signal if the alternating current power is not input. A power controlling circuit produces a control signal to apply the power charged in the battery to the system, if the alternating current power is not normally applied, and a main power supplying circuit supplies either the alternating current power input through the power switch or current from the battery as an external power supply in accordance with the control signal of the power controlling circuit.

DETAILED DESCRIPTION OF THE PREFERRED EMBODIMENTS

A preferred embodiment of the present invention is now described in detail with reference to the accompanying drawings.

Figure 1:
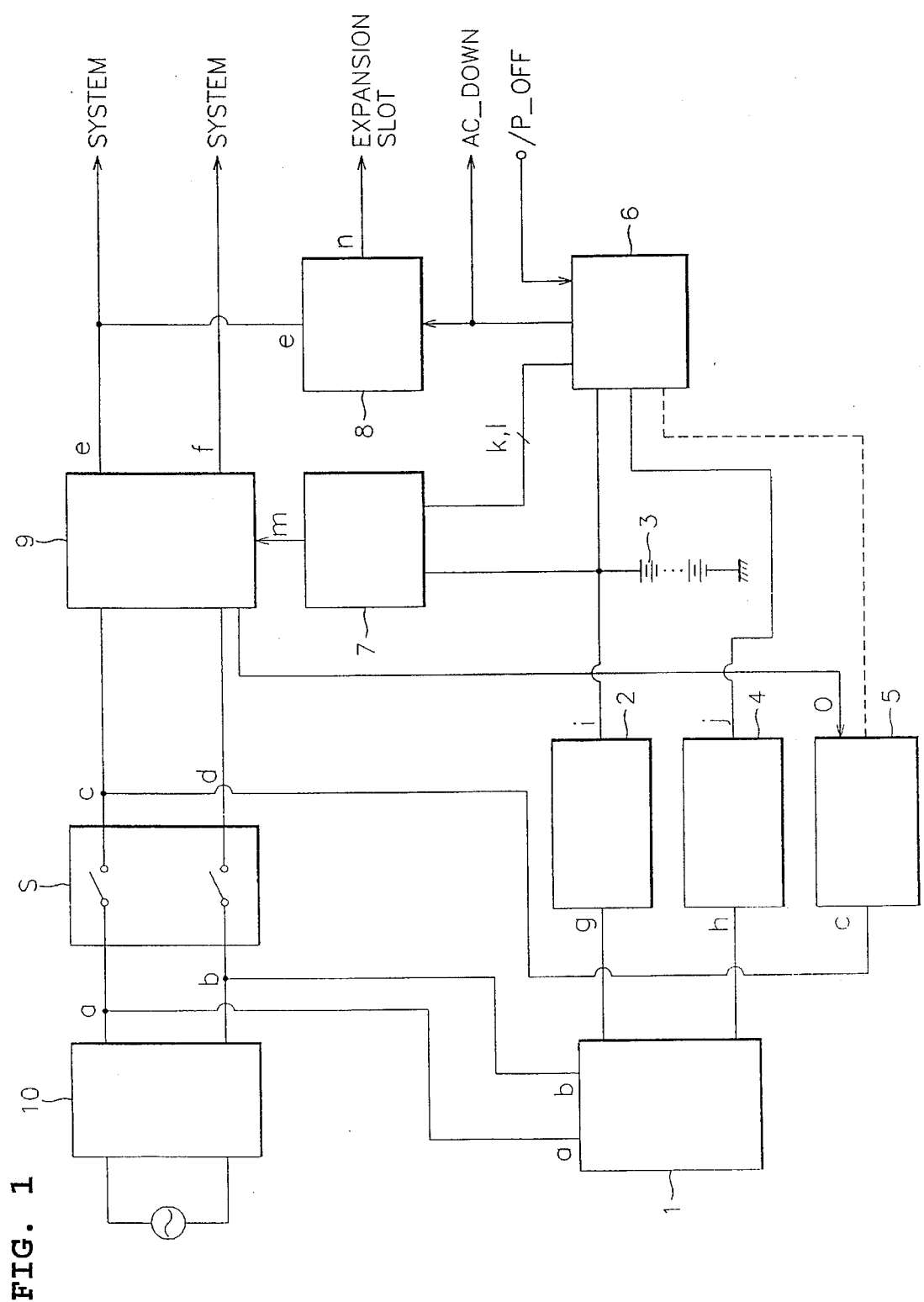
FIG. 1 is a detailed circuit diagram of a backup power-supply system for an emergency in accordance with a preferred embodiment of the present invention.

FIG. 1 is a detailed block diagram of a backup power-supply system for an emergency in accordance with a preferred embodiment of the present invention.

The backup power-supply system includes power input circuit 10, a power switch S and linear conversion rectifying circuit 1 respectively having input terminals connected to two output terminals a and b of the power input circuit 10. Battery charging circuit 2 has an input terminal connected to an output terminal g of the linear conversion rectifying circuit 1. Battery 3 has a bipolar terminal connected to an output terminal i of the battery charging circuit 2. Power condition sensing circuit 4 has an input terminal connected to an output terminal h of the linear conversion rectifying circuit 1. Power controlling circuit 6 has input terminals respectively connected to battery 3, an output terminal j of the power condition sensing circuit 4, and power switch condition sensing circuit 5, and has another input terminal connected to power-off signal line/P_OFF. DC/DC converter 7 has an input terminal connected to the battery 3 and output terminals k and l of the power controlling circuit 6. Main power supply system 9 has input terminals connected to output terminals c and d of the power switch S and an output terminal of the DC/DC converter 7. Expansion slot power cut-off circuit 8 has input terminals connected to a power-supply stoppage sensing signal AC_DOWN of the power controlling circuit 6.

Figure 2:
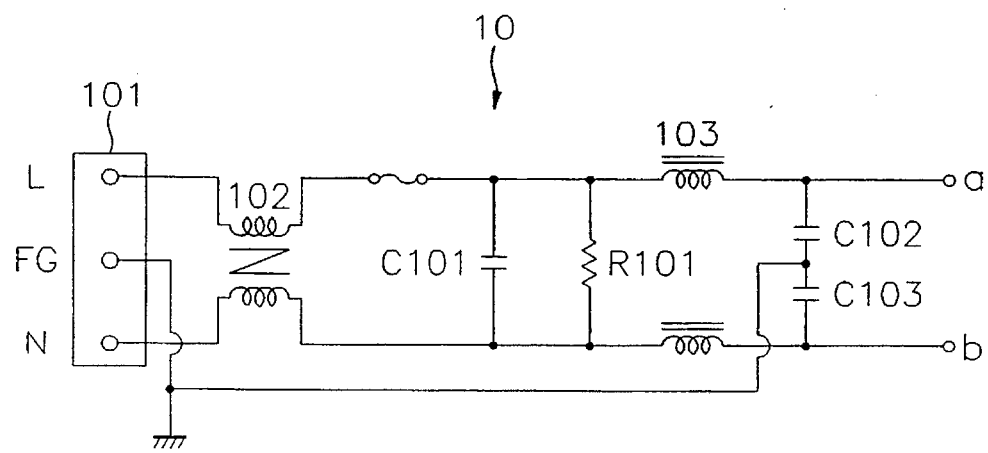
FIG. 2 is a detailed circuit diagram of a power supply connector for a backup system in accordance with the preferred embodiment of the present invention.

FIG. 2 is a detailed circuit diagram of a power-supply connector of the backup system in accordance with the preferred embodiment of the present invention, and which is embodied as power input circuit 10.

The power input circuit 10 includes a connector 101, a line filter 102 connected to the connector 101, resistance R101 and capacitor C101 connected to the line filter 102 in parallel, a line filter 103, and capacitors C102 and C103 connected between the line filter 103.

The main power supply system 9 of the backup power-supply system includes a line filter connected to output terminals c and d of the power switch S, a first capacitor connected between both terminals of the line filter, a first resistance having one terminal connected to a node of the first capacitor and the line filter, a diode bridge having an input terminal connected to the other terminal of the first resistance and having an output terminal connected to an output terminal m of a DC/DC converter 7, second and third capacitors and second and third resistances connected between the output of the diode bridge and ground, fourth and fifth resistances, a fourth capacitor and a zener diode connected between the output terminal m of the DC/DC converter 7 and ground, a sixth resistance, a fifth capacitor, a first diode and a transformer connected to the output terminal m of the DC/DC converter 7, a second diode connected to an output terminal of the transformer, a third diode connected between the second diode and ground, a seventh resistance connected to the third diode in parallel, a sixth capacitor, a filter coil connected between the seventh resistance and a seventh capacitor, an eighth resistance connected to the seventh capacitor in parallel, and an eighth capacitor connected to the eighth resistance in parallel.

Figure 3:
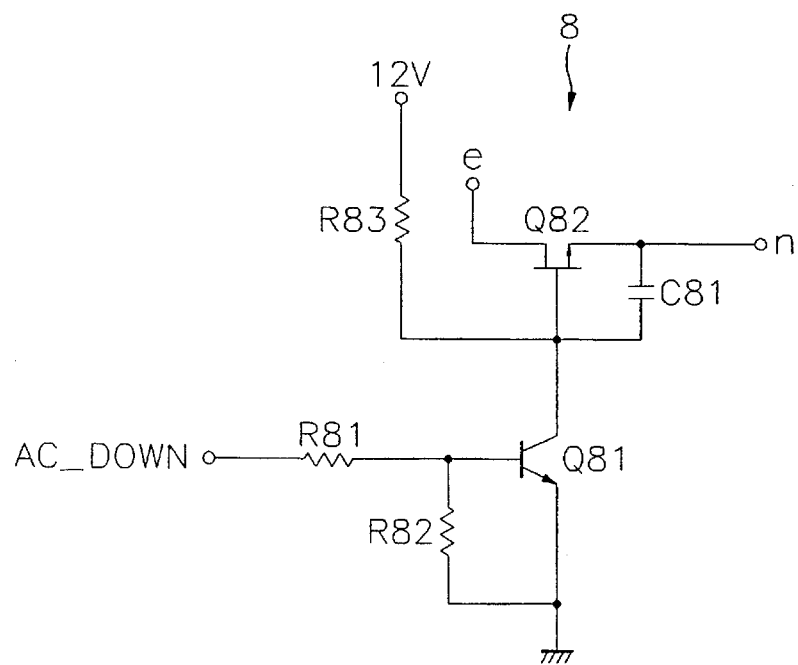
FIG. 3 is a detailed circuit diagram of expansion slot power cut-off circuit for a backup system in accordance with the preferred embodiment of the present invention.

FIG. 3 is a detailed circuit diagram of the expansion slot power cut-off circuit 8.

The expansion slot power cut-off circuit 8 includes resistance R81 having one terminal connected to power-supply stoppage sensing signal line AC_DOWN, transistor Q81 having a base connected to the other terminal of the resistance R81 and an emitter grounded, resistance R82 connected between the base and emitter of the transistor Q81, resistance R83 connected between a signal line of 12 V and a collector of the transistor 81, transistor Q82 having a drain connected to an output terminal e of the main power supply system 9 and having a gate connected to the collector of the transistor Q81 connected between gate and source of the transistor Q82.

Figure 4:
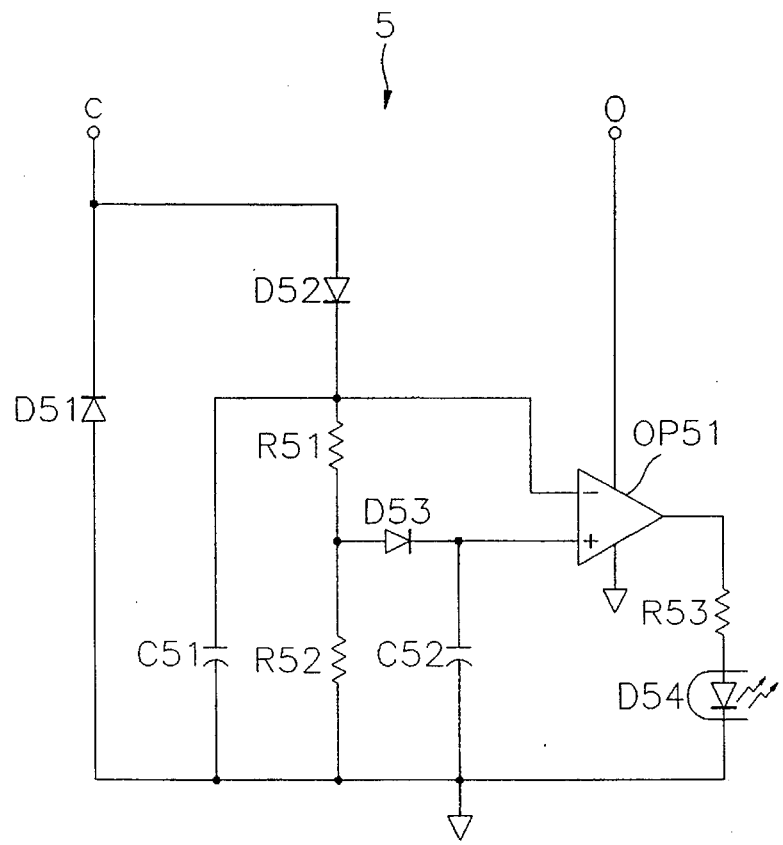
FIG. 4 is a detailed circuit diagram of power switch condition sensing circuit for a backup power system in accordance with the preferred embodiment of the present invention.

FIG. 4 is a detailed circuit diagram of the power switch condition sensing circuit 5.

The power switch condition sensing circuit 5 includes diode D51 connected in a contrary direction between an output terminal c of the power switch S and ground, diode D52 having an anode connected to the output terminal c of the power switch S, resistance R51 and R52 and capacitor C51 connected between a cathode of the diode D52 and ground, diode D53 having its anode connected to node of the resistances R51 and R52, capacitor C52 connected between a cathode of the diode D53 and ground, a comparator OP51 having an inverting input terminal connected to the cathode of the diode D52 and having a non-inverting input terminal connected to the cathode of the diode D53, and resistance R53 and a luminous diode D54 connected between an output terminal of the comparator OP51 and ground in series. In addition, the power Vcc of the comparator OP51 is connected to the output terminal of the main power-supply system 9.

Figure 5:
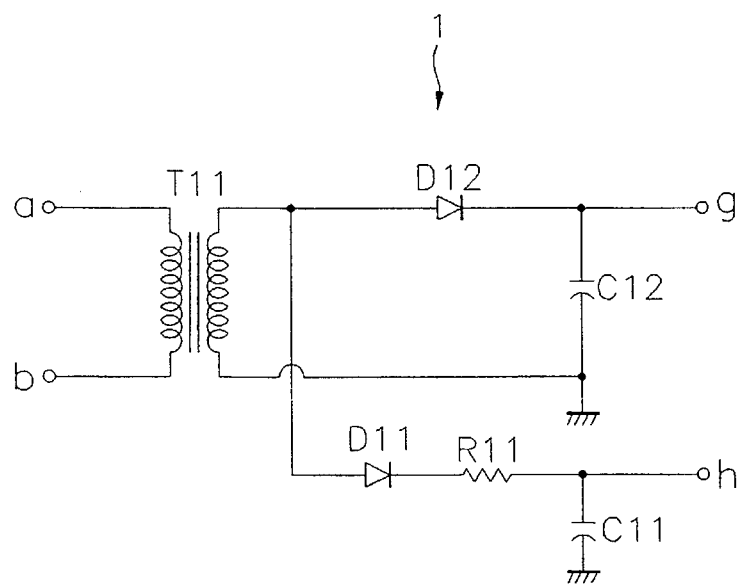
FIG. 5 is a detailed circuit diagram of linear conversion rectifying circuit for a backup system in accordance with the preferred embodiment of the present invention.

FIG. 5 is a detailed circuit diagram of the linear conversion rectifying circuit in accordance with the preferred embodiment of the present invention.

The linear conversion rectifying circuit 1 includes a transformer T11 having an input terminal connected to output terminals a and b, diode D11 connected to an output terminal of the transformer T11 and ground in serial, resistance R11, capacitor C11, diode D12 having its anode connected to the output terminal of the transformer T11, and capacitor C12 connected between a cathode of the diode D12 and ground.

Figure 6:
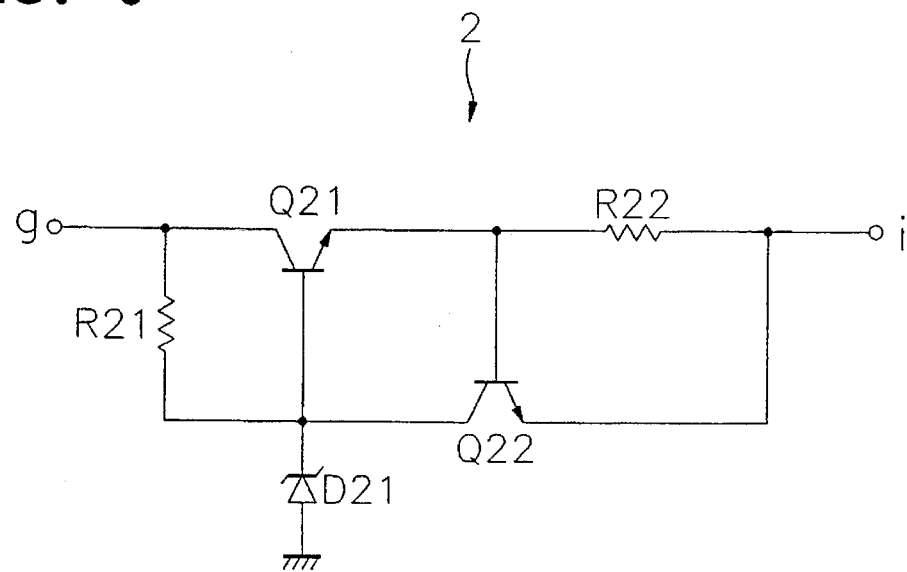
FIG. 6 is a detailed circuit diagram of battery charging circuit for a backup system in accordance with the preferred embodiment of the present invention.

FIG. 6 is a detailed circuit diagram of the battery charging circuit 2 in accordance with the preferred embodiment of the present invention.

The battery charging circuit 2 includes a transistor Q21 having a collector connected to an output terminal g of the linear conversion rectifying circuit 1, resistance R21 connected to the collector and base of the transistor Q21, a zener diode D21 connected between the base of the transistor Q21 and ground, a transistor Q22 having a base connected to an emitter of the transistor Q21 and having a collector connected to the base of the transistor Q21, and a resistance R22 connected between the base and emitter of the transistor Q22.

Figure 7:
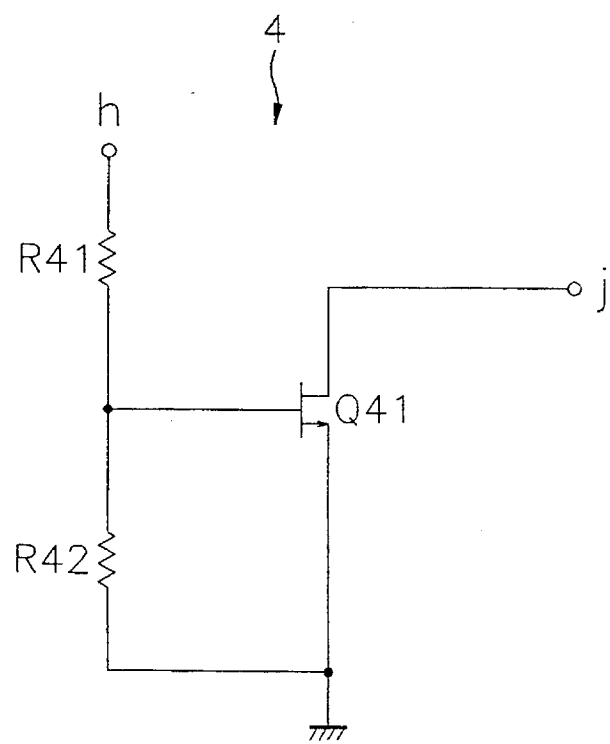
FIG. 7 is a detailed circuit diagram of power condition sensing circuit for a backup system in accordance with the preferred embodiment of the present invention.

FIG. 7 is a detailed circuit diagram of a power condition sensing circuit in accordance with the preferred embodiment of the present invention.

The power condition sensing circuit 4 includes a pair of resistances R41 and R42 connected in series between an output terminal h and ground, and a transistor Q41 having a gate connected to a node of the pair of the resistances R41 and R42 and a source grounded.

Figure 8:
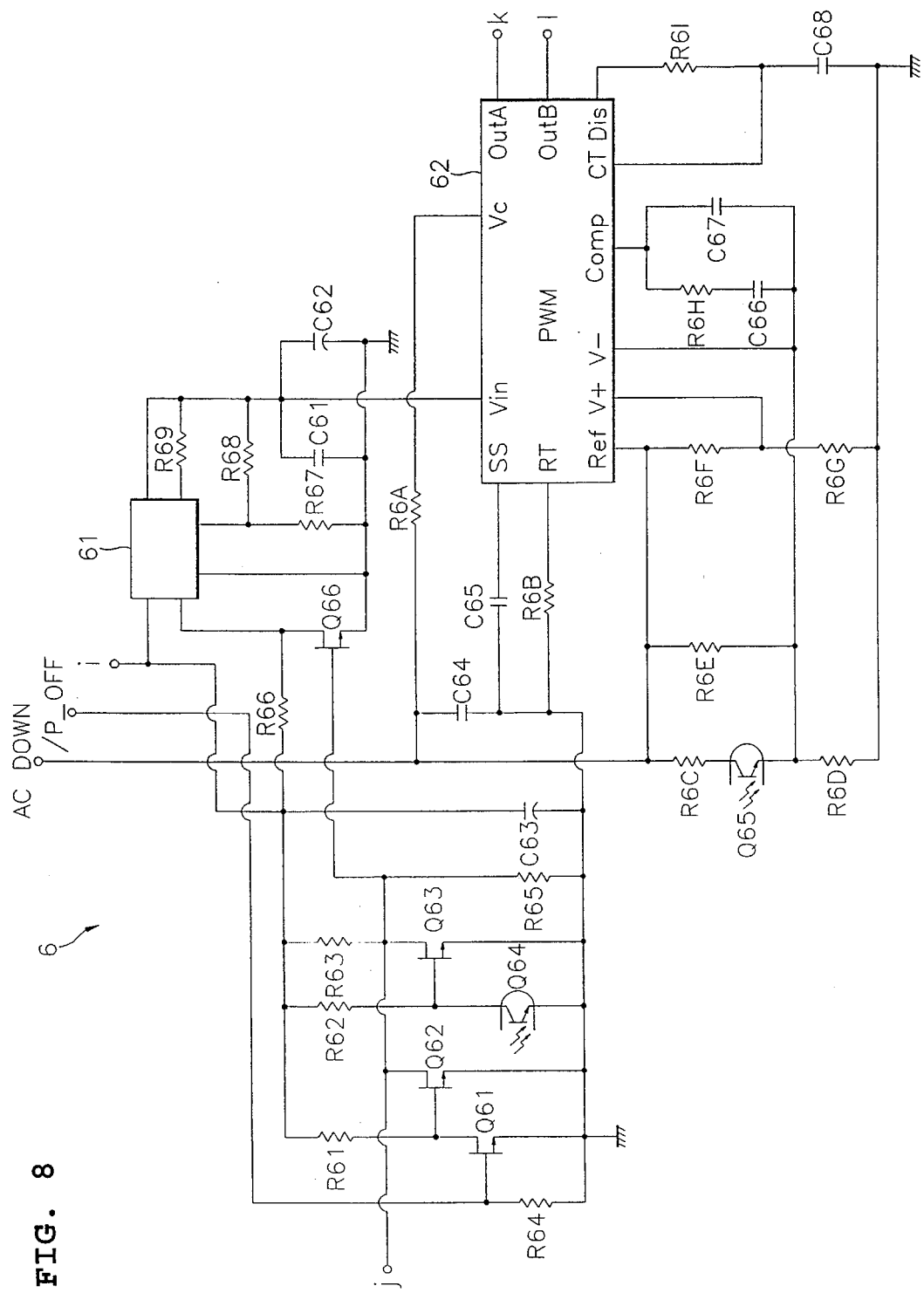
FIG. 8 is a detailed circuit diagram of power controlling circuit for a backup system in accordance with the preferred embodiment of the present invention.

FIG. 8 is a detailed circuit diagram of the power controlling circuit 6 in accordance with the preferred embodiment of the present invention.

The power controlling circuit 6 includes resistances R61, R62, R63, R64 and R65 connected between an output terminal j of the power condition sensing circuit 4 and power off signal line/P_OFF, transistors Q61, Q62 and Q63, a light-receiving transistor Q64, resistances R66, R67, R68 and R69 forming a regulator 61 connected to an output terminal i of the battery charging circuit 2 and its peripheral circuit, a transistor Q66, capacitors C61 and C62, resistances R6A, R6B, R6C, R6D, R6E, R6F, R6G, R6H and R6I forming a pulse width modulator 62 and its peripheral circuit, capacitors C63, C64, C65, C66, C67 and C68, and a light receiving transistor Q65. The luminous diode D54 of the power switch condition sensing circuit 5 in FIG. 4 and the light-receiving transistor Q64 of the power controlling circuit 6 in FIG. 8 may be designed to be one photo-coupler.

Figure 9:
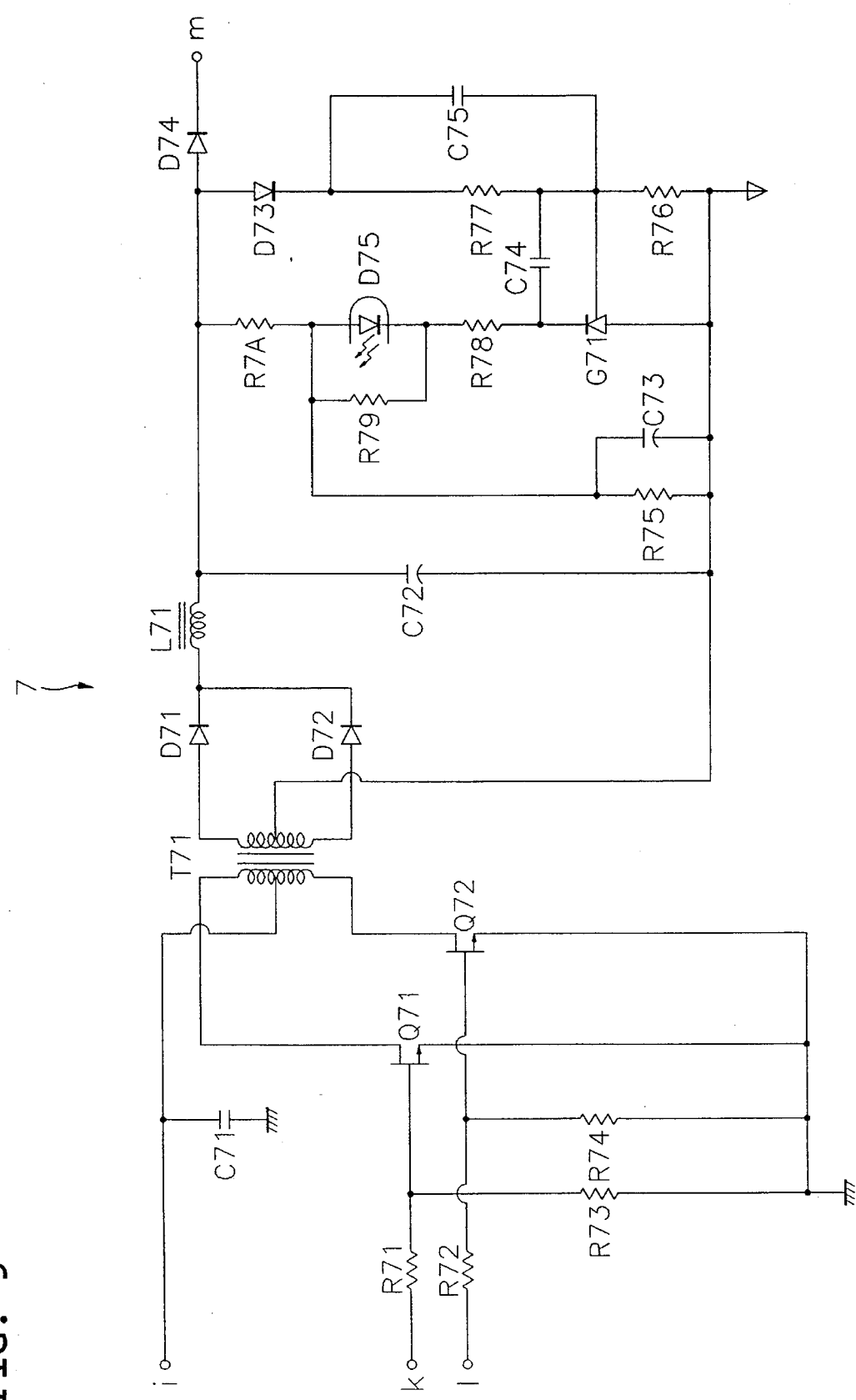
FIG. 9 is a detailed circuit diagram of a direct/direct converter for a backup system in accordance with the preferred embodiment of the present invention.

FIG. 9 is a detailed description of the DC/DC converter 7 in accordance with the preferred embodiment of the present invention.

The DC/DC converter 7 includes resistances R71, R72, R73 and R74, respectively connected between output terminals k and l and ground, transistors Q71 and Q72, capacitor C71 and a transformer T71 connected to an output terminal i of the battery charging circuit 2, diodes D71 and D72 connected to an output terminal of the transformer T71 and a coil L71, resistances R75, R76, R77, R78, R79 and R7A, diodes D73 and D74, a luminous diode D75, and capacitors C72, C73, C74 and C75, and a tri-state gate G71. The luminous diode D75 of the DC/DC converter 7 and the light-receiving transistor Q65 of the power controlling circuit 6 in FIG. 8 may be designed to be one photo-coupler.

The preferred embodiment of the present invention mainly applies to a personal computer, but the technical scope of the present invention is not limited thereto.

The operation of the backup power-supply system of the present invention is now described as follows.

Alternating current power is applied to the power input circuit 10 to operate the backup power-supply system.

The overall circuit operates according to one of the following cases as determined by the conditions of the power input circuit 10 and the power switch S:

A. the power is applied and the power switch S is being turned on;

B. the power is applied and the power switch S is being turned off;

C. the power is not applied to the power input circuit 10 due to the failure of an electric power supply or carelessness of a user and the power switch S is being turned on; or D. the power is not applied and the power switch S is being turned off.

The operation of the present invention is now described in detail according to each case as mentioned above.

A. In a case that the power is applied and the power switch S is being turned on, the alternating current power passes the power input circuit 10 in such a manner that the noises are removed by the line filters 102 and 103 and capacitors C101, C102 and C103, and then supplied to the main power supply system 9 through the power switch S.

The alternating current power is rectified as a direct current power by the diode bridge of the main power supply system 9, and its noises are removed through filtering elements therein after the power has passed through a transformer and rectifying diode.

Accordingly, the direct current power of 5 V and 12 V is produced. This direct current power is applied to the system and simultaneously applied to the expansion slot in which expansion devices such as video cards, sound cards fax/ modem cards are inserted.

The alternating current power received through the power input circuit 10 is input to the main power supply system 9 through the power switch, and is simultaneously input to the linear conversion rectifying circuit 1, too. As shown in FIG. 5, the voltage of the alternating current power input to the linear conversion rectifying circuit 1, is dropped by the transformer T11 of the linear conversion rectifying circuit 1, and the power is rectified to be a DC power by the diodes D11 and D12 and condensers C11 and C12, and supplied to the battery charging circuit 2 in FIG. 6 and power condition sensing circuit 4 in FIG. 7, respectively.

As shown in FIG. 6, the direct current power input to the battery charging circuit 2 is converted into a regulating current by the battery charging circuit 2 and then supplied to the battery 3 to charge the battery 3.

If the alternating current power is in a normal condition, the transistor Q41 of the common power condition sensing circuit 4 is turned on, and ground potential from the power condition sensing circuit 4 is applied to drain terminals of the transistors Q62 and Q63 of the power controlling circuit 5 as shown in FIG. 6.

If the ground potential is applied to the drain terminals of the transistors Q62 and Q63 of the power controlling circuit 6, the transistors Q62, Q63 and Q66 are turned off to stop the operation of the regulator 61. Once the operation of the regulator 61 is stopped, the regulating voltage that is being supplied to the pulse width modulator 62 from the regulator 61 is cut off to stop the operation of the pulse width modulator 62.

As the pulse width modulator 62 of the power controlling circuit 6 stops operating, the DC/DC converter 7 stops operating so as not to influence the operation of the main power supply system 9 at all. The DC power rectified by the bridge diode of the main power supply system 9 is then applied to the system.

If the transistor Q41 of the power condition sensing circuit 4 is turned on, the transistors Q63 and Q64 of the power controlling circuit 6 in FIG. 8 maintain the turn-off condition at all times regardless of the operating condition of the power switch condition sensing circuit 5. Thus, the power switch condition sensing circuit 5 controlling the operation of the transistors Q63 and Q64 does not influence the operation of the circuit at all.

As the power supply stoppage sensing signal AC_DOWN produced from the pulse width modulator 62 of the power controlling circuit 6 maintains a low level, the transistor Q81 of the expansion slot power cut-off circuit 8 is turned off, and the transistor Q82 is turned on to apply the DC current power of 5 V that is produced from the main power supply system 9 to the expansion slot.

B. In a case that the power is applied and the power switch S is being turned off, a user turns off the power switch S to cut off the power that is supplied from the common power input circuit 10 and applied to the main power supply system 9, and the main power supply system 9 is not operated.

The alternating current power supplied from the common power input circuit 10 is input to the linear conversion rectifying circuit 1 and rectified into a direct current power by the linear conversion rectifying circuit 1.

The DC power rectified by the linear conversion rectifying circuit 1 is applied to the battery charging circuit 2 to charge the battery 3 by the battery charging circuit 2. The DC power rectified by the linear conversion rectifying circuit 1 is also input to the power condition sensing circuit 4 illustrated in FIG. 7, and the transistor Q41 of the common power condition sensing circuit 4 is turned on if the alternating current power is in a normal condition in such a manner that the operation of the DC/DC converter 7 is stopped by the power controlling circuit 6.

If the transistor Q41 is turned on, the transistors Q63 and Q64 of the power controlling circuit 6 maintain the turn-off condition all the time, regardless of the operating condition of the power switch condition sensing circuit 5, such that transistors Q63 and Q64 do not influence the operation of the circuit.

If the operation of the DC/DC converter 7 is stopped, the power charged in the battery 3 is not discharged, and the battery 3 maintains the constantly-charged condition by the battery charging circuit 2.

As the power-supply stoppage sensing signal AC_DOWN that is produced from the pulse width modulator of the power controlling circuit 6 maintains a low level, the transistor Q81 of the expansion slot power cut-off circuit 8 is turned off and the field effect transistor Q82 is turned on. However, since the operation of the main power supply system 9 is being stopped, the DC power is not applied to the expansion slot.

C. In a case that the power is not applied by the removal of the power input circuit 10 due to the failure of an electric power supply or carelessness of a user, and the power switch S is being turned on, the alternating current power supply is totally cut off, and the operation of the main power supply system 9 and linear conversion rectifying circuit 1 stop operating so as to gradually diminish the power applied to the system and expansion slot.

At this point, since the transistor Q41 of the power condition sensing circuit 4 is turned off, the power produced from the battery 3 is applied to the drain terminal of the transistor Q63 of the power controlling circuit 6. Once the power is applied to the transistor Q63 of the power controlling circuit 6, the transistor Q64 is turned on according to a signal produced from the luminous diode D54 of the power switch condition sensing circuit 5 in FIG. 4, and the transistor Q63 is turned off and the transistor Q66 is turned on to start the operation of the regulator 61. If the operation of the regulator 61 starts, constant voltage is applied to the pulse width modulator 62 of the regulator 61 to operate the pulse width modulator 62.

If the power switch S is being turned off as detected by power switch condition sensing circuit 5, driving power is applied to the comparator OP51, and the capacity of the capacitor C52 is designed to be larger than the capacity of the capacitor C51.

Accordingly, if the alternating current common power is not applied from the common power input circuit 10 owing to a power breakdown or carelessness of a user while the user is using the system, the comparator OP51 outputs a high-level signal in such a manner that the luminous diode D54 luminesces.

If the luminous diode D54 luminesces, the transistor Q64 of the power controlling circuit 6 is turned on to operate the power controlling circuit 6.

If the pulse width modulator 62 is operated, the operation of the DC/DC converter 7 starts, and the power of the battery 3 is converted into a DC power of good quality through the DC/DC converter 7 to be produced to the main power supply system 9.

The DC power input to the main power supply system 9 passes the first transformer and rectifying diode and its noises are removed through the first and second filtering elements. The power is thus filtered and then converted into a DC power of 5 V and 12 V to be produced. The DC power is applied to the system to drive the system for a predetermined period of time so that the system may perform the backup of the information.

In this occasion, the high-level power supply stoppage sensing signal AC_DOWN is produced to the system from the pulse width modulator 62 of the power controlling circuit 6, so that the system may recover the information.

Since the power charged in the battery 3 is not enough to operate the overall system, the high-level power supply stoppage sensing signal AC_DOWN that is applied to the system from the pulse width modulator 62 of the power controlling circuit 6, is transmitted to the expansion slot power cut-off circuit 8 in order to cut off supplying the power of 5 V produced from the main power supply system 9 to the expansion slot.

If the high-level power supply stoppage sensing signal AC_DOWN is input from the pulse width modulator 62 of the power controlling circuit 6, the transistor Q81 of the expansion slot power cut-off circuit 8 is turned on, and the field effect transistor Q82 is turned off. Accordingly, the direct current supplied to the expansion slot to the main power supply system 9 is cut off.

After completion of the back-up of the information the user was working on, the low-level power-off signal/P_OFF is input to the gate terminal of the transistor Q61 of the power controlling circuit 6 to turn off the transistor Q61 and turn on the transistor Q62. As the transistor Q62 is turned on, the transistor Q66 is turned off to stop the operation of the regulator 61. If the operation of the regulator 61 stops, the regulating voltage applied to the pulse width modulator 62 from the regulator 61 is cut off to stop the operation of the pulse width modulator.

D. In a case that the power is not applied and the power switch S is being turned off, if the power switch S is turned off right after the supply of the alternating current power is stopped while the alternating current power is applied, the capacitors C51 and C52 of the power switch condition sensing circuit 5 are being charged while the power is not yet discharged so as to output the high-level signal from the comparator OP51.

Thus, the power controlling circuit 6 is driven by the battery 3 and the back-up of the operating information may be performed.

However, the above-mentioned seldom occurs actually. If the supply of the alternating current power is stopped while the power switch is being turned off, neither the power input circuit 10 nor the power switch condition sensing circuit 5 is operated. Accordingly, the main power supply system 9, linear conversion rectifying circuit 1, and power controlling circuit 6 are not operated, and therefore, the system does not work.

In a case that the power is not applied by the removal of the power connector due to the failure of electric power supply or carelessness of a user, while the power switch S is being turned on, and the alternating current power supply is totally cut off, the power charged in the battery is supplied to the system by the DC/DC converter 7, and the system may recover the information the user was working on. Thus, if the alternating current power is cut off unexpectedly in a small-sized processing system such as a personal computer, the inventive backup power-supply system for emergency may prevent the loss of the information the user was working on.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A backup power-supply system for an emergency comprising:

a power switch turned on or turned off by a user to control the supply of an alternating current;

a linear conversion rectifying circuit which receives said alternating current on an input path independent of said power switch, and which rectifies said alternating current and produces a direct current;

a charging circuit which converts said direct current input from said linear conversion rectifying circuit into a regulating current source and which produces a regulating current;

a battery charged by said regulating current source input from said charging circuit and which produces battery current;

a power condition sensing circuit which senses if said alternating current is normally applied from said linear conversion rectifying circuit and which produces a signal indicative of the sensing result;

a power switch condition sensing circuit which produces a low-level signal if said alternating current is input through said power switch, and which produces a high-level signal if said alternating current is not input;

a power controlling circuit which transmits a power supply stoppage sensing signal to an external system and which produces a first control signal to cause application of said battery current to said external system according to said signals from said power condition sensing circuit and said power switch condition sensing circuit, and when said alternating current is not normally applied, and which produces a second control signal to prevent application of said battery current, if a power-off signal is input from said external system;

a DC/DC converting circuit which converts said battery current into a direct battery current and which provides said direct battery current in response to said control signals input from said power controlling circuit; and a main power supplying circuit which rectifies and supplies said alternating current as an external power supply if said alternating current input through said power switch is normally applied, and which supplies said direct battery current input from said DC/DC converting circuit as said external power supply, if said alternating current is not normally applied.

2. The system according to claim 1, further comprising an expansion slot power cut-off circuit which cuts off said external power supply applied to an expansion slot from said main power supply circuit if said power supply stoppage sensing signal is input from said power controlling circuit.

3. The system according to claim 1, further comprising a power input circuit which includes:

a connector which is electrically coupled to a power socket;

a first line filter coupled to said connector;

a first resistance and a first capacitor coupled to said first line filter in parallel;

a second line filter; and second and third capacitors coupled between said first and second line filters.

4. The system according to claim 1, wherein said main power supplying circuit includes:

a diode bridge which rectifies said alternating current input from said power switch;

first and second capacitors and first and second resistances coupled between an output of said diode bridge and ground;

third and fourth resistances, a third capacitor and zener diode coupled between an output terminal of said DC/DC converting circuit and ground;

a fifth resistance, a fourth capacitor, a first diode and a transformer coupled to said output terminal of said DC/DC converting circuit; and second and third diodes, sixth and seventh resistances and fifth, sixth and seventh capacitors coupled to an output terminal of said transformer to form a filter circuit.

5. The system according to claim 2, wherein said expansion slot power cut-off circuit includes:

a first transistor which is controlled by said power-supply stoppage sensing signal; and a second transistor which is turned off so as not to apply said external power supply from said main power supply circuit to said expansion slot if said first transistor is turned on, and which is turned on so as to apply said external power supply from said main power supply circuit to said expansion slot if said first transistor is turned off.

6. The system according to claim 1, wherein said power switch condition sensing circuit includes:

a first diode having a cathode coupled to an output terminal of said power switch and an anode coupled to ground;

a second diode having an anode coupled to said output terminal of said power switch;

first and second resistances and a first capacitor coupled between a cathode of said second diode and ground;

a third diode having an anode coupled to a node between said first and second resistances;

a second capacitor coupled between a cathode of said diode and ground;

a comparator which produces a high-level signal if a potential charged in said first capacitor is lower than a potential charged in said second capacitor; and a luminous diode which luminesces when said high-level signal is input from said comparator.

7. The system according to claim 1, wherein said linear conversion rectifying circuit includes:

a transformer receiving said alternating current; and a half-wave rectifier to perform half-wave rectification on an output of said transformer and to divide said output into two channels.

8. The system according to claim 1, wherein said battery charging circuit includes:

a first transistor having a collector coupled to an output terminal of said linear conversion rectifying circuit;

a first resistance coupled between said collector and a base of said first transistor;

a zener diode coupled between said base of said first transistor and ground;

a second transistor having a base coupled to an emitter of said first transistor and having a collector coupled to said base of said first transistor; and a second resistance coupled between a base and emitter of said second transistor.

9. The system according to claim 1, wherein said power condition sensing circuit includes:

a pair of resistances coupled in series between an output terminal of said linear conversion rectifying circuit and ground; and a transistor having a gate coupled to a node between said pair of resistances and a source grounded.

10. The system according to claim 6, wherein said power controlling circuit includes: a light-receiving transistor circuit coupled between an output terminal of said power condition sensing circuit and a power off signal line;

a regulator circuit coupled to an output terminal of said battery charging circuit; and a pulse width modulator circuit coupled to said light-receiving transistor circuit and said regulator circuit to produce said first and second control signals and said power supply stoppage sensing signal.

11. The system according to claim 10, wherein said luminous diode and a light-receiving transistor in said light-receiving transistor circuit are formed of one photo-coupler.

12. The system according to claim 10, wherein said DC/DC converting circuit includes:

a first circuit coupled between output terminals of said power controlling circuit and ground;

a transformer coupled to an output terminal of said battery;

a second circuit coupled between an output terminal of said transformer and a coil; and a regulating voltage circuit coupled between an output terminal of said coil and ground which outputs said direct battery current.

13. The system according to claim 12, wherein a luminous diode in said regulating voltage circuit and a light-receiving transistor in said light-receiving transistor circuit are formed of one photo-coupler.

14. The system according to claim 1, wherein said main power supplying circuit determines that said alternating current is not normally applied when a power level of said alternating current input through said power switch falls below that of said battery current.

15. A power supply system for a computer, comprising:

an input power terminal;

a main power switch coupled to said input power terminal and controlled by a user to supply power to said computer;

a rectifier circuit which receives an alternating current from said input power terminal and which produces a direct current;

a battery capable of outputting a battery current;

a battery charging circuit which receives said direct current from said rectifier circuit and charges said battery;

a power sensing circuit which monitors said direct current from said rectifier circuit to determine whether said alternating current is within a normal range, and which generates a power condition signal indicative of said determination;

a power switch sensing circuit which monitors a switch state of said power switch and which generates a power switch condition signal indicative of said switch state;

a power controller which receives said power condition signal and said power switch condition signal and which generates a control signal having a condition based on a logical combination thereof; and a power supply circuit capable of receiving said alternating current through said main power switch and said battery current from said battery, said power supply circuit rectifying said alternating current and supplying one of said rectified alternating current and said battery current as said power supplied to said computer according to said condition of said control signal from said power controller.

16. A power supply system according to claim 15, wherein said power controller also receives a power-off signal from said computer and wherein said condition of said control signal is also based on said power-off signal.

17. A power supply system according to claim 15, further comprising an expansion slot power controller which cuts off the supply of said external power supply to an expansion device of said computer in response to a warning signal from said power controller, said power controller generating said warning signal based at least on said power condition signal.

18. A power supply system according to claim 17, wherein said power controller also outputs said warning signal to said computer, said computer performing an information backup operation in response to said warning signal.

19. A power supply system according to claim 18, wherein said power supply circuit provides said battery current as said power supplied to said computer system for a period of time sufficient for said computer to complete said information backup operation.

20. A power supply system for a computer, comprising:

an input power terminal;

a main power switch coupled to said input power terminal and controlled by a user to supply power to said computer;

a first rectifier circuit which receives an alternating current from said input power terminal and which produces a first direct current;

a second rectifier circuit which receives said alternating current from said input power terminal through said main power switch and which produces a second direct current;

a battery capable of outputting a battery current;

a battery charging circuit which receives said first direct current from said first rectifier circuit and charges said battery;

a power sensing circuit which monitors said first direct current from said first rectifier circuit to determine whether said alternating current is within a normal range, and which generates a power condition signal indicative of said determination;

a power switch sensing circuit which monitors a switch state of said power switch and which generates a power switch condition signal indicative of said switch state;

a power controller which receives said power condition signal and said power switch condition signal and which generates a control signal having a condition based on a logical combination thereof;

a DC/DC converting circuit which receives said battery current and which provides a boosted battery current according to said condition of said control signal; and a power supply circuit capable of receiving both said second direct current through said main power switch and said boosted battery current from said DC/DC converting circuit, said power supply circuit supplying one having a greater power level of said second direct current and said boosted battery current as said power supplied to said computer.

21. A power supply system according to claim 20, wherein said power controller also receives a power-off signal from said computer and wherein said condition of said control signal is also based on said power-off signal.

22. A power supply system according to claim 20, further comprising an expansion slot power controller which cuts off the supply of said external power supply to an expansion device of said computer in response to a warning signal from said power controller, said power controller generating said warning signal based at least on said power condition signal.

23. A power supply system according to claim 22, wherein said power controller also outputs said warning signal to said computer, said computer performing an information backup operation in response to said warning signal.

24. A power supply system according to claim 23, wherein said power supply circuit provides said boosted battery current as said power supplied to said computer system for a period of time sufficient for said computer to complete said information backup operation.

\* \* \* \* \*